United States Patent Office
3,440,599
Patented Apr. 22, 1969

3,440,599
DIGITALLY CONTROLLED VIBRATIONAL SEISMIC PROSPECTING
Kenneth H. Waters and Billy J. Heath, Ponca City, Okla., assignors to Continental Oil Company, Ponca City, Okla., a corporation of Delaware
Filed June 22, 1966, Ser. No. 559,460
Int. Cl. G01v 1/22
U.S. Cl. 340—15.5                                       18 Claims

ABSTRACT OF THE DISCLOSURE

Method and apparatus for seismic prospecting wherein a vibrational seismic energy input device is controlled in response to an optimum sweep signal which may be constructed by digital techniques. A series of digital electrical values representing a predetermined seismic input signal are derived from a computer, digital record or whatever and passed through a digital to analog converter, whereupon the output analog signal is applied to drive the seismic vibrator device.

---

This invention relates to improvements in the art of geophysical prospecting and, more particularly, but not by way of limitation, to method and apparatus for controlling a vibrational seismic survey with digital electrical equipment and for thereafter processing, recording and/or compositing received seismic signals in digital form.

Heretofore, vibrational seismic prospecting has been carried out by means of analog signal processes. An analog signal input or sweep signal is employed to control the vibrator input to the earth, and detected seismic energy from a seisphone array is processed and recorded by means of analog equipment. Certain inherent difficulties are encountered in the practice of vibrational surveying, these problems being caused and accentuated by certain natural conditions of the surrounding terrain as it affects or varies the earth's inherent filter characteristics. Thus, in certain applications, the performance level of a vibrational survey is somewhat diminished by the attendant difficulties of manufacturing and using a sufficiently accurate input sweep signal to avoid frequency distortion and low signal to noise ration in subsequent correlation processing. Further, and this is especially true in marine vibrational surveying, the limited dynamic range which is available on analog recording equipment will sometimes prohibit the application of necessary filter techniques.

The present invention overcomes the above shortcomings in a vibrational geophysical survey by exercising system control through digital electrical techniques. That is, a more accurate input sweep signal embodying all known desirable characteristics is constituted from known parameters in digital electrical form. The vibrational survey is performed in accordance with this input sweep signal and subsequent detected return signals are converted to digital form and digitally recorded. The digital recording of multi-sweep resultant signals can be easily composited by adding successive return signals of like character into the digital storage in proper locations; that is a particularly advantageous digital process since the previously used analog compositing method required a series of analog recording and playback procedures.

The present invention contemplates equipment for constituting a digital control signal for determining the input sweep signal in a vibrational survey system as well as the digital recording of multi-trace seismic signals received from a detector array. More particularly, the invention contemplates the employ of a computer for constituting the sweep control signal from known parameters which may be found applicable for a particular terrain; thereafter, a plurality of detected seismic signals are digitalized for re-entry and digital storage under the control of the computer. Thus, the computer receives each seismic trace signal in digital form and stores it in addressable locations for further recall, processing or whatever. The digital information representative of the plurality of seismic signals, as well as a digital representation of the input sweep signal, are stored under control of the computer timing system such that travel times of all signals or digital representations of such are available for recall and identification.

Therefore, it is an object of the present invention to provide a vibrational seismic surveying system which is controlled by digital electric signals having predetermined, ideal characteristics for propagation through a particular earth medium.

It is also an object of the present invention to provide such a digitally controlled vibrational survey system wherein the received seismic signals are digitalized for processing and storage in a computer.

It is further an object of the present invention to provide a digital survey system wherein digital representations of returned seismic signals are stored in serial, addressable locations of a computer memory such that the physical allocation of seismic information within said memory is a representation of travel time.

Finally, it is an object of this invention to provide a system wherein a vibrational survey proceeds under digital control such that returned seismic signals are digitalized and stored in proper addressable memory locations within a computer for subsequent computer processing, recording and/or compositing, and an entire procedure or vibrational sweep takes place automatically under the control of the computer after initial energization.

Other objects and advantages of the invention will be evident from the following detailed description when read in conjunction with the accompanying drawings which illustrate the invention.

Figure 1:
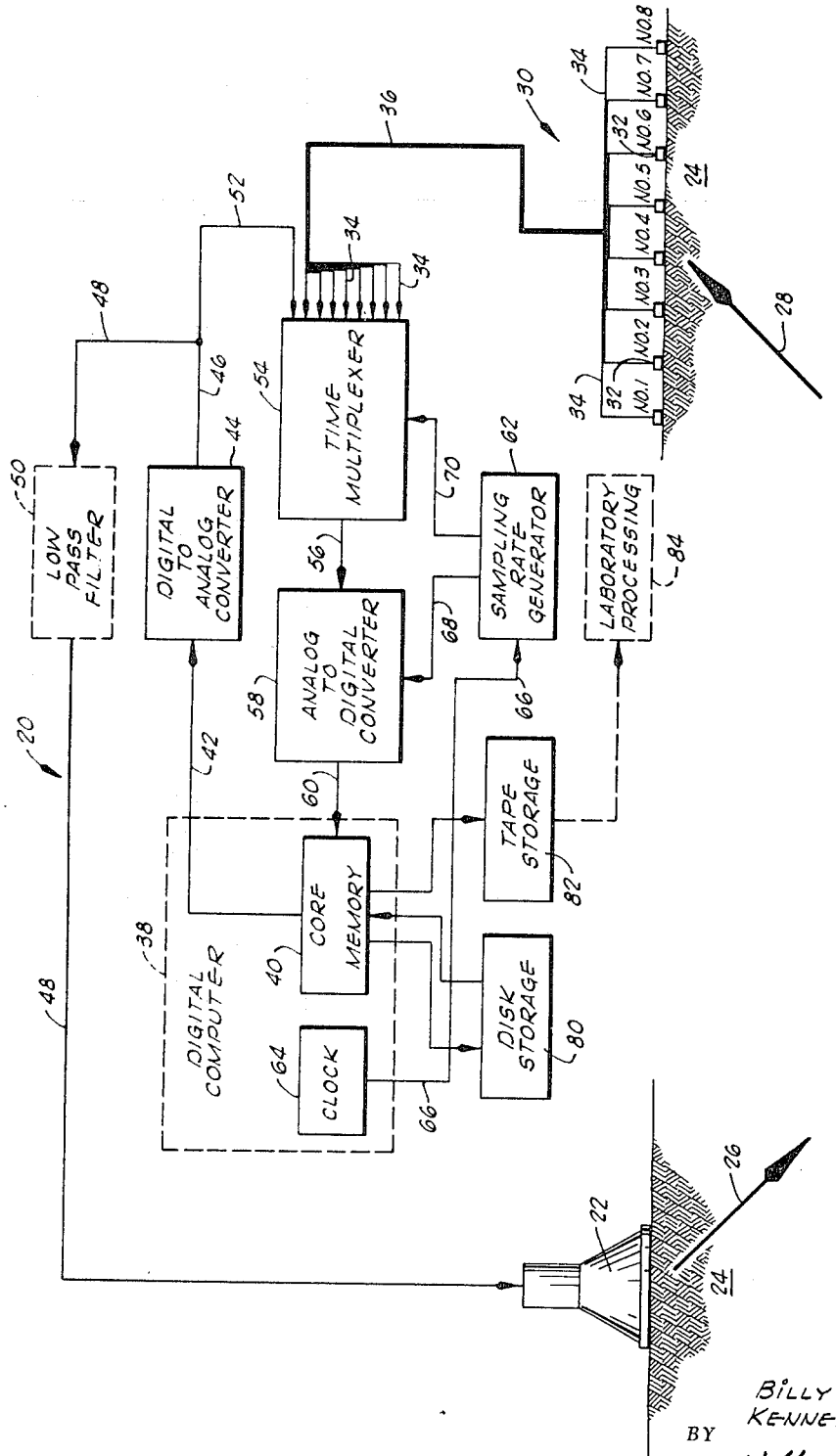
FIG. 1 is a block diagram of a digitally controlled vibrational survey system in accordance with the invention.

FIG. 1 illustrates a vibrational survey system as controlled by a digital control network 20. A vibrator 22 is placed in firm contact with the earth medium 24 to impart controlled frequency seismic energy, shown generally by arrow 26, toward the earth substrata. Reflected or otherwise returned seismic enregy, shown generally by arrow 28, is detected in a plural detector array 30. Each individual detector 32 of the detector array 30 is firmly planted or secured at the surface of earth medium 24 to detect seismically induced earth particle motion, and the seismic signals are conducted on parallel leads 34 and cable 36 to the seismic signal processing network within the digital control system 20.

The seismic vibrator 22 may be one of the types which is commonly used in the art, such as hydraulic, pneumatic, electromechanical, etc. The overall method and operation of a vibrational seismic survey system such as is referred to herein is the particular subject matter of U.S. Patent No. 2,989,726 entitled "Method of and Apparatus for Determining the Travel Time of a Vibratory Signal Between Spaced Points" in the name of Crawford et al. and assigned to the present assignee. A suitable vibrator device is disclosed in various U.S. patents; for example, a hydraulic type of vibrator is disclosed in the U.S. Patent No. 3,159,233 entitled, "Seismic Transducer Construction," in the name of Clynch et al. and assigned to the present assignee.

A digital computer 38 is employed in the digital control 20 of the system to provide both the output sweep signal for driving vibrator 22 and the sequencing, storage and processing of received seismic signals present on the leads 34 from individual detectors 32 of the array 30. The digital computer 38 may be a standard, commercially available computer unit and can be installed and programmed to provide the basic control of the digital control system 20, the various timing and data shifting functions being left to the computer program. One of the less expensive or small capacity computers is suitable since the storage capacity and operations required in seismic signal processing can be kept relatively small. For example, the Model 92 or Model 930 computers manufactured by Scientific Data Systems, Incorporated of Santa Monica, Calif. may be employed to good advantage. The selection as to size and capabilities of the computer unit will also be influenced by any additional processing steps which it may be desirable to perform on-site during operation of the survey system.

The digital computer 38 is required to have an internal memory which is sufficiently large to handle the necessary number of data bits which will occur instantaneously through a survey operation. A suitable form of internal storage is the magnetic core assembly 40, core memory 40 being integral with the digital computer 38. The digital computer 38 can be operated to place an optimum sweep signal into the core memory 40; whereupon the survey can be initiated and the sweep signal is shifted out of core memory 40 in digital form on a lead 42 to a digital to analog converter 44. The digital construction or the character and bit make-up of the sweep signal indication should be preset so that sufficient signal resolution is obtained through the digital to analog converter 44. For example, a twelve bit digital word comprised of two six-bit characters has been found suitable for conveying the proper digital values.

As the twelve bit digital values are sequentially shifted out of core memory 40, the digital to analog converter 44 provides an analog output signal on lead 46 which is equivalent to the successive digital word values. The analog voltage on lead 46 is in the form of a series of step functions, step increments being very small, and it is conducted on a lead 48 for input to control the vibrator 22. In some instances it may be desirable to interpose a low pass filter 50 in the signal line 48 to smooth the control voltage prior to its application to the drive components (not shown) of the vibrator 22. The output of digital to analog converter 44 is also supplied on a lead 52 for input to a time multiplexer 54, as will be further described.

Thus, the control voltage on lead 48, having controlled frequency and amplitude characteristics as preset by the digital computer 38, drives the vibrator unit 22 to impart seismic energy vibrations into the earth medium 24. Returned seismic energy such as is reflected and/or refracted from various underlying substrata of the terrain are detected at the detector array 30. The detector array 30 is shown as including eight individual detectors 32, Nos. 1 through 8; however, it should be understood that different numbers of detectors may be employed in the detector array 30. For example, it is quite usual to have twelve or even more detectors or even parallel sub-arrays of detectors situated at each individual detector position. The use of eight detectors as depicted in FIG. 1 is merely exemplary to indicate the presence of a plurality.

The seismic signals which are detected at each of the No. 1 through No. 8 detector positions are analog in form and are each conducted on one of the parallel leads 34 through cable 36 for parallel input to the time multiplexer 54. Time multiplexer 54, also receiving input of the ideal sweep signal as generated by digital computer 38 and present on lead 52, accepts all parallel inputs on lead 52 and plural leads 34 to provide a time sequential analog output signal on lead 56. The time sequential analog signal on lead 56 is then applied to an analog to digital converter 58; whereupon each successive analog signal sample is converted to its respective digital output value on a lead 60 for re-entry to the digital computer 38.

The time multiplexer 54 and analog to digital converter 58 are commercially available circuits and can generally be procured as peripheral equipment to the selected digital computer 38. Actually, the time multiplexer 54 and analog to digital converter 58 can be obtained as an integral stage, the digital conversion taking place sequentially in a multiplexing mode of operation. The rate of operation of time multiplexer 54 and the analog to digital converter 58 is controlled by a suitable sampling rate generator 62 which may be synchronized with the system clock generator 64 of digital computer 38 via lead 66. The sampling rate generator 62 then provides a rate trigger output on lines 68 and 70 to synchronize the operation of the analog to digital converter 58 and time multilexer 54, respectively.

It can be stated generally that a sampling rate adjustable between 1 millisecond and 4 milliseconds is adequate for seismic data processing. Thus, to cite an example, the sampler generator 62 would control the time multiplexer 54 and analog to digital converter 58 such that sampling is effected at 1 millisecond intervals. That is, each analog signal input, lead 52 and leads 34, would be sampled one time during each millisecond of field signal time and the sampled value would be converted to a digital equivalent voltage indication on output lead 60 from converter 58.

The analog to digital converter 58 is preferably selected so that a sufficiently high order of digital resolution can be achieved. Thus, once again, the digital values may be represented by a twelve bit digital word (two six-bit digital characters) for conduction to digital computer 38; whereupon the successive digital values are shifted into the core memory 40. Generally speaking, it is not practical to hold all digitized trace information in core memory 40 for the recording of an entire trace length or vibrational sequence. Thus, trace information may be buffered out of core to storage disc 80 in well-known manner to preserve the time relationships while greatly reducing requirements of core memory size.

Figure 2:
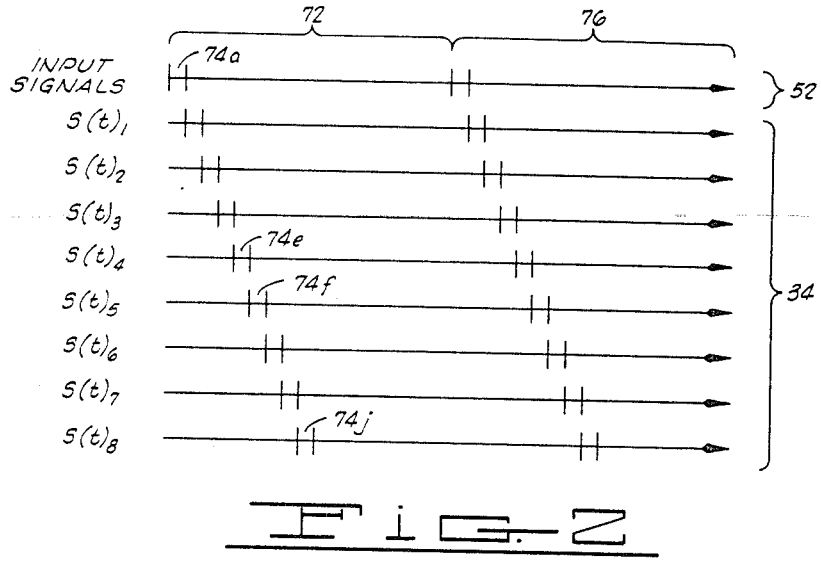
FIG. 2 is a time graph of a family of seismic traces illustrating a signal sampling procedure as employed in the multiplexing and digital conversion stages of the present invention.

FIG. 2 depicts the manner of sampling of the input sweep signal (lead 52) and the plurality of field detected seismic trace signals $S(t)_1$–$S(t)_8$ (leads 34). It should be understood that the time graph of the input sweep signal and seismic traces $S(t)_1$ through $S(t)_8$ only includes about a 2 millisecond interval, an entire wave train or signal period taking from .5 second to as much as 25 seconds of continuous signal duration. A 1 millisecond sampling interval is shown by the bracket 72 to provide a means of reference. Successive sampling intervals 74 are then shown as sequential sectors of each signal, the sampling intervals 74 representing that portion of the analog signal which the time multiplexer 54 selects or enables for evaluation in the analog to digital converter 58.

It can be noted that the successive samples 74 are taken in order through all signals; whereupon the slicing or sampling is repeated upon initiation of the next sampling interval 76. Each successive sample of each analog signal is then converted into a twelve bit digital word as present on lead 60 (FIG. 1). The sampling interval of 1 millisecond, a selected minimum time interval for most seismic work, is more than sufficient to allow a great many digital operations within the digital converter 58 and digital computer 38 and its peripheral equipment, since the cycle time of such digital computers is on the order of 2 to 5 microseconds. Also, provision can be made for a greater number of input analog seismic traces (leads 34) by adjusting the sample time width of time multiplexer 54 so that all input signal channels can be sampled within the sampling interval. Such sampling rate control is well known in the art and can easily be synchronized with the digital computer 38 through the common timing source, the computer clock 64.

The sequence of seismic digital values are then shifted out of core memory 40 to a disc storage 80, the shift being controlled by the computer program such that information at the auxiliary disc storage 80 is readily recalled. The disc storage 80 is preferably of the type known as the on-line rapid access storage; such storage systems being commercially available as peripheral equipment to digital computer systems. Exemplary forms of a suitable disc storage means 80 would be the Model 9166 or Model 9267 Rapid Access Disc System manufactured by Scientific Data Systems, Inc. for use with the Model 92 or 930 computers. These storage modules consist of from one to four twelve inch discs which are mounted on a common vertical shaft, each disc providing storage for 524,288 characters plus necessary timing signals which are distributed among 128 tracks (64 per surface). A separate read/write head is provided for each track, thus reducing the access time to a minimum.

The use of such rapid access disc systems enables the transfer of large blocks of data between the computer 38 and the disc storage 80, large block transfer being particularly desirable in time-sharing processing operations. In the present usage, the basic unit of recorded information on a single disc may be a sector of 128 twelve-bit digital words or 256 characters, with 16 sectors contained in each of the 128 tracks, thus it is possible to store 262,144 twelve bit digital words when utilizing both sides of a single storage disc within disc storage 80 and this is more than a sufficient number of digital words to represent a large number of analog seismic signals at one millisecond sampling for up to 30 seconds of signal time. In the event that still greater storage capacity is required, the additional disc storage media can be relied upon.

The program of digital computer 38 may be set so that the sequential digital values from core memory 40 are successively applied to predetermined storage locations on the disc storage 80. Thus, the digital values stored at this storage 80 are addressable for recall in accordance with the program of digital computer 38 so that further digital computation can be carried out, or, the contents of disc storage 80 can be read out and applied to suitable tape storage mechanism 82. Such tape storage 82 may also be selected from peripheral equipment which are designed for use with the specific digital computer. The digital code and character format of digital recording at tape storage 82 is a matter of choice within the limits provided for through the output of the digital computer 38. For example, a twelve bit digital code group may again be employed for providing digital indication at tape storage 82 and appropriate identification and timing information may be generated within the digital computer 38 in well-known manner. A digital tape, containing very many individual seismic shot sequences, could then be removed and transported to a laboratory or other remote installation for further processing and/or correlation (denoted by dash-line box 84); or, if suitable digital computer equipment is initially provided, the digital correlation procedure can be carried out in the field with suitable programming of digital computer 38.

The auxiliary storage function of disc storage 80 also serves to aid in the performance of another valuable function, that of compositing the seismic data. Compositing procedure is well-known in the art and consists of the algebraic summation of a plurality of seismic signals detected in individual detectors 32 of detector array 30 during a series of different vibrational energy input sequences. For example, it may be desirable to perform several vibrational input sequences, each one carried out with the vibrator 22 at a different position on the surface of the earth 24. A compositing procedure would then consist of summing all individual signals of the several sequences which are detected in the same detectors 32 or sub-arrays thereof.

The disc storage 80 serves as a depository of the composited seismic inuformation. The addition takes place wtihin the computer 38 as controlled by its program whereupon the further summed or composited signal trace values are restored at disc storage 80. Thus for each group of seismic signals, as detected from a vibration sequence, the partially summed previous traces are brought into the computer 38 from disc storage 80, the new group of trace signals are added in, and the respective summed trace signals are again placed in disc storage 80. This is a conventional type of computer usage and the operation or programming for such is well-known in the art. After one vibrational sequence has been run and its signal return through detector 30 is processed through digital computer 38 and applied to selected storage locations on the disc storage media 80, a subsequent vibrational sequence can be summed in for storage in the identical time relationship; the vibrational sequence being initiated by the same ideal input signal as derived from computer 38 under the control of computer clock 64.

Thus, seismic data values which are similar as to travel time and detector position but originating from different vibrational sequences exist in summation at their respective storage locations within disc storage 80. This compositing procedure may be continued for as many vibrational sequences as is desired or beneficial to obtain good geophysical sounding results. Each sweep resultant is thus composited with all previous sweeps to thereby constitute a final trace having increased signal-to-noise ratio with valid peaks or events being accentuated. This process of digital addition within computer 38 and core memory 40 with continual changing of the information in disc storage 80 takes the place of previously employed analog method which required plural narrow track recording and wide track playback of the channels, a more time consuming procedure requiring more adjustment and observation.

In the operation of the vibrational seismic surveying system of FIG. 1, a desired sweep signal may be compared in digital form by control of digital computer 38 to derive a signal which has optimum characteristics for a particular field project. This digital sweep signal is stored in the computer internal memory or core memory 40 for periodic recall to control the system. By a switch initiation at the computer console, the sweep signal, in digital form, is fed on lead 42 to the digital to analog converter 44 at precise timing intervals as controlled by the digital computer 38 (clock 64). The digital to analog converter 44 then constructs a corresponding analog signal on leads 46 and 48 for application to drive the vibrator 22 through a frequency sweep as computed. The initiation of the sweep signal output also applies a sweep signal on lead 52 to time multiplexer 54, such that it is sampled and reconverted to digital form in the analog to digital converter 58 for deposition in the core memory 40 of digital computer 38. Thus, a time reference is provided for later computations of signal travel time, this time reference being stored in core memory 40 along with received seismic signals or digital data values as will be described below.

The received seismic signals are detected in the plurality of detectors 32 and they too are applied via leads 34 to time multiplexer 54 whereupon they are sampled at the rate set by sampling rate generator 62 (synchronized with the computer clock 64). Time multiplexer 54 may be set to sample at a 1 millisecond interval to provide sequential samples of all detected seismic signals and thus constitute a time sequential analog signal output on lead 56 to analog to digital converter 58. The converter 58 then provides an output on lead 60 which consists of a series of twelve bit digital values, each representative of a seismic data value at a selected sample time, and the sequential digital values are clocked into the core memory 40 of digital computer 38. The serial digital information within core memory 40 may then be applied to a disc storage 80 whereupon the sequence of digital values is added into a predetermined storage location on the disc. Thus, after a vibrational sequence is completed, an entire family of seismic traces along with the input sweep signal is present at addressable locations within disc storage 80.

In the normal manner of vibrational survey usage, subsequent vibrational sequences may be performed to provide additional data for use in compositing procedures which serve to diminish random noise and interference indications while accentuating valid events. Thus, each subsequent vibrational sequence is detected through detector array 30 and the seismic data is sampled and converted to digital form for application through core memory 40; whereupon each individual information bit is added in computer 38 with each individual stored bit from disc storage 80, addition being in the same time relationship as previous vibrational return signals. The compositing is thereby performed by simple summation of digital values of like time and point of detection in array 30, the resultant being again applied to the storage medium of disc storage 80.

After the requisite number of sweeps, the contents of the disc storage 80 may be dumped onto the tape storage unit 82, also under control or the computer program. The digital tape may then be digitally correlated or otherwise processed. All timing of the surveying system is controlled by the computer program after the original initiation or enabling of sweep signal output from core memory 40. Such a vibrational survey system is freed from the necessity of having large numbers of analog sweeps available since new sweeps of different frequency range and/or different characteristics, ideal in nature, can easily be calculated from a few input parameters with a proper program in the digital computer 38.

A second mode of operation is enabled due to the inherent characteristics of the digital computer and its various storage techniques. That is, the received seismic data values can be sampled and converted to digital values and thereafter assigned to numbered storage locations which will automatically relate the storage number to the delay time. Hence, there is no need, unless one suspects alteration of the sweep by the digital to analog converter 44, to feed a portion (lead 52) of the analog sweep signal back into the computer 38 for purposes of establishing time delays.

Figure 3:
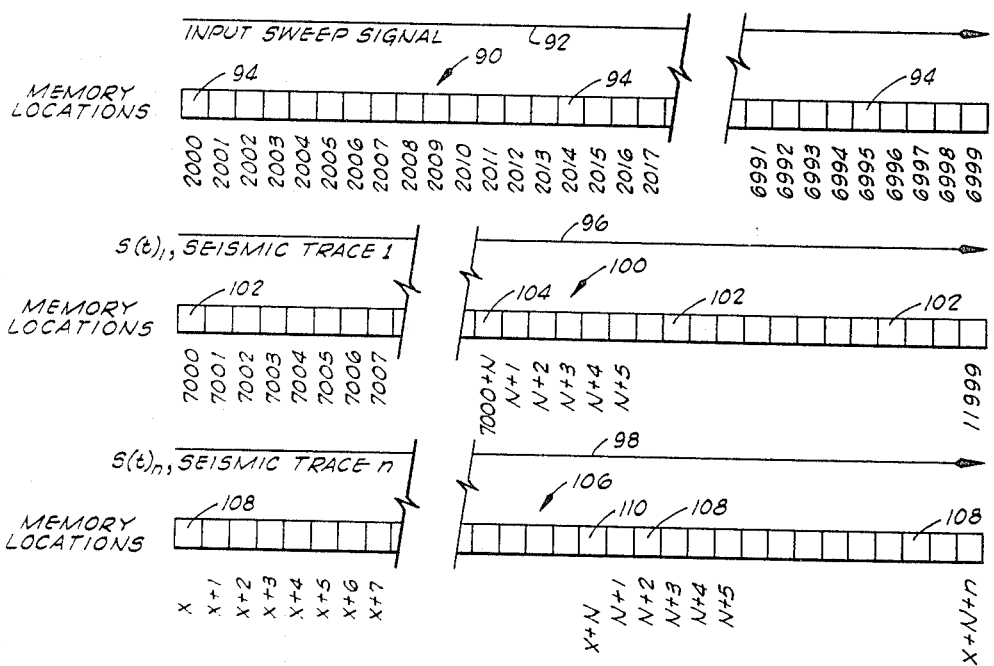
FIG. 3 is a graph depicting memory location vs. seismic signal time for a group of seismic trace signals as the storage function is performed in an alternative mode of operation.

FIG. 3 represents the manner in which various series of sequential storage locations might be assigned to retain predetermined signal information. A first series of disc storage locations 90, for example locations 2000 through 6999, are reserved for the input sweep signal information, as indicated by the signal-time line 92. Thus, each of the individual memory locations 94 contains a digital representation of a sample of the desired input sweep signal 92, the frequency and amplitude characteristics of which are adjusted by the digital computer 38 and its associated program. The memory locations 90 are depicted in exemplary form as including 5000 consecutive storage locations which should be a sufficient number for the proper resolution of most vibrational surveying procedures. That is, each individual memory location 94 will be able to store the digital equivalent of up to 4 milliseconds of analog sweep signal time, such that a total storage of 20,000 milliseconds or 20 seconds is more than adequate for most foreseeable seismic applications.

Selected sectors of disc memory location are also assigned for each of the seismic trace signals which are received at the respective detectors or phones. The received seismic signals, $S(t)_1$ through $S(t)_n$ as denoted by the signal-time lines 96 and 98, are also assigned to specific addressable disc sectors from the computer. A series 100 of disc memory locations 102 is depicted as being reserved for the storage of successive digital voltage values representative of the sequential analog signal samples of seismic trace $S(t)_1$, signal line 96. The addressable memory locations 102 are numbered (arbitrary and for illustration purposes) from 7000 through 11,999. This number span is also inclusive of 5000 individual storage locations in order to include all inputs of the $S(t)_1$ signal value for the vibrational sequence. The 7000 +N storage location 104 denotes (for example) a point at which the reception of returned seismic energy actually begins or first appears on the seismic trace $S(t)_1$ (signal line 96).

Similar addressable memory locations of same number and order are provided for each of the seismic traces received, $S(t)_1$ through $S(t)_n$. Thus, the $S(t)_n$ would be allotted a disc memory location 106 which includes 5,000 addressable and consecutive disc storage locations 108 numbered from $x$ to $x+N+n$. The $x+N$ memory location 110 denotes (for example) a point at which actual seismic signal return might begin, the appropriate digital equivalent value being stored therein. Any number of seismic trace inputs may be processed so long as the auxiliary disc memory system is selected to be of sufficient size. As stated previously, 5000 memory locations, representative of up to 20 seconds of vibrational survey time, should be a sufficient amount of storage space per seismic signal.

In the operation of the system in the alternative mode, the vibrator 22 may be controlled in accordance with the digital output as read from memory locations 94 of storage locations 90. Only an initial portion of the memory locations 90 will contain digital sweep signal values in most instances. The initiation of digital computer 38 begins the sequencing of read out from the memory locations 94 and, simultaneously, digital value input is enabled to each of the seismic trace memory locations, e.g. storage sectors 100 and 106. Thus, received values are continually assigned to numbered storage locations which will automatically relate the storage number to the delay time for each seismic trace. Subsequent compositing of additional returned signals may be carried out simply by re-initiating a read out of input sweep signal digital information, the remainder of the process being completed in identical manner under control of the computer clock. That is, all received seismic signals will be sampled, converted and assigned to their proper storage locations as defined by trace number and delay time.

The foregoing discloses a method and apparatus for carrying out a vibrational seismic survey wherein more reliable results are obtainable. The construction of an ideal input sweep signal by means of digital electrical equipment provides more advantageous use or control of the earth's inherent filter characteristics such that received seismic traces can be subsequently processed to provide a greater yield of useable information.

Changes may be made in the combination and arrangement of elements as heretofore set forth in this specification and shown in the drawings, it being understood, that changes may be made in the embodiments disclosed without departing from the spirit and scope of the invention as defined in the following claims.

What is claimed is:
1. A method of vibrational seismic exploration wherein the seismic input signal to an earth medium has a unique, non-repetitive frequency content of predetermined duration, comprising the steps of:
constructing an optimum input seismic signal in the form of a series of digital electrical values;
imparting seismic energy vibrations into the earth at a first point in accordance with said digital electrical values, which vibrations have the frequency characteristics and duration of said constructed signal;

detecting reflected seismic energy vibrations from the earth at a second point in the form of analog electrical signals;

converting said detected analog signals to digital electrical values; and storing said detected and converted digital values in serial order on a time base which is comparable to that of said constructed digital electrical values of the input seismic signal.

2. A method of vibrational seismic exploration as set forth in claim 1 wherein said step of imparting seismic energy vibrations into the earth at a first point comprises the steps of:

converting said constructed digital electrical values to an analog sweep signal; and controlling the seismic energy vibrations into the earth in response to said analog electrical sweep signal.

3. A method of vibrational seismic exploration as set forth in claim 2 wherein said steps of converting and storing said detected analog signals as digital electrical values and of comparing said constructed digital electrical values comprises the steps of:

converting each of said detected analog signals and said analog sweep signal to sequential, time-sharing digital voltage values; and storing said sequential, time-sharing digital voltage values in addressable, sequential memory locations.

4. A method of vibrational seismic exploration as set forth in claim 3 wherein said step of storing said digital voltage values comprises:

storing each successive digital value of each digital electrical value originating from both the analog sweep signal and the detected seismic energy vibrations in separate addressable memory locations.

5. A method of vibrational seismic exploration as set forth in claim 1 which is further characterized to include the steps of:

imparting plural series of said seismic energy vibrations into the earth; and detecting, converting and storing each series of said vibrations such that, digital values having the same travel time in each series will be represented as a composite digital value in storage.

6. A method of vibrational seismic exploration wherein a digital computer is employed to control the generation of vibrational seismic signals and storage of detected seismic return signals, comprising the steps of:

computing in the form of a series of digital electrical values a sweep signal having predetermined frequency characteristics and duration;

converting said digital electrical values to produce a sweep signal having precise analog values;

imparting seismic energy vibrations into the earth at a first point, which vibrations are in response to said analog values and have the frequency characteristics and duration of said sweep signal;

detecting reflected seismic energy vibrations from the earth at a second point in the form of analog electrical signals;

converting said detected analog signals to digital electrical values; and storing said detected and converted digital electrical values in serial order at a storage rate per value which is comparable to that of said computed digital electrical values of the sweep signal such that signal travel time indications of selected seismic events can be derived.

7. A system for generating seismic energy with an earth medium comprising first means for generating a series of digital electrical values representative of an analog seismic sweep signal having predetermned frequency characteristics and time duration; second means for converting said digital electrical values to form optimum electrical analog sweep signal, said second means including clock means for precise timing of the conversion of said digital electrical values; and vibration means driven by said analog sweep signal to induce seismic energy vibrations into the earth.

8. A method of vibrational seismic exploration as set forth in claim 6 wherein said steps of converting said detected analog signals and of storing said converted digital electrical values comprises the steps of:

converting each of said detected analog signals and said analog sweep signal to sequential time-sharing digital voltage values; and storing said digital voltage values in addressable, sequential memory locations.

9. A method of vibrational seismic exploration as set forth in claim 8 wherein said step of storing said digital voltage values comprises:

storing each successive digital value of each digital electrical value originating from both the sweep signal and the detected seismic energy vibrations in separate addressable memory locations.

10. A method of vibrational seismic exploration as set forth in claim 6 wherein said step of detecting comprises:

detecting a plurality of reflected seismic energy vibrations from the earth at a plurality of locations disposed in predetermined manner at said second point.

11. A method of vibrational seismic exploration as set forth in claim 10 wherein said steps of converting and storing comprise:

converting each of said plurality of detected analog signals and said analog sweep signal to sequential time-sharing digital voltage values; and storing said digital voltage values in addressable, sequential memory locations.

12. A method of vibrational seismic exploration as set forth in claim 6 which is further characterized to include the steps of:

imparting plural series of said seismic energy vibrations into the earth; and detecting, converting and storing each series of said vibrations such that digital values representing the same travel times in each series will be represented as a composite digital value in storage.

13. A system for vibrational seismic exploration wherein a digital computer is employed to control the generation of vibrational seismic signals and the subsequent storage of seismic return signals, comprising:

means for generating a series of digital electrical values representative of a sweep signal having predetermined frequency characteristics and duration;

means for converting said digital electrical values to an electrical analog sweep signal;

vibration means driven by said analog sweep signal to induce seismic energy vibrations into the earth at a first point;

means for detecting reflected seismic energy vibrations from the earth at a second point and providing an output in the form of analog electrical signals;

means for converting said analog sweep signal and said detected analog signals to a time-sharing output of digital electrical values; and means for storing each of said digital electrical values in addressable memory locations as controlled by said digital computer such that seismic signal travel times are inherently preserved through storage sequence.

14. A system for vibrational seismic exploration as set forth in claim 13 wherein said means for detecting comprises:

a plurality of detectors disposed in predetermined array and each providing an output in the form of an analog electrical signal.

15. A system for vibrational seismic exploration as set forth in claim 14 wherein said means for converting comprises:

analog to digital converter means receiving each of the detected analog electrical signals and the analog sweep signal at the input and providing a time sequential digital voltage output representing periodic samples of all inputs.

16. A system for vibrational seismic exploration as set forth in claim 15 wherein said means for storing comprises:
   disc storage means including a plurality of separate storage tracks, each track being separately addressable for read out; and
   means for recording converted sequential digital values from each of the detected signals and the sweep signal on separate storage tracks of said disc storage means in serial order such that signal travel times are preserved through physical location of stored information.

17. A system as set forth in claim 7 wherein said first means comprises:
   computer means providing a digital output in the form of a series of electrical values representative of a seismic sweep signal.

18. A system as set forth in claim 7 which is further characterized to include:
   low pass filter means connected to receive the output from said means for converting said digital electric values to an analog sweep signal and having its output connected to drive said vibrator means.

References Cited

UNITED STATES PATENTS

| | | | |
|---|---|---|---|
| 3,167,738 | 1/1965 | Westerfield. | |
| 3,221,298 | 11/1965 | Burns | 181—.5 X |
| 3,264,606 | 8/1966 | Crook et al. | 181—.5 X |
| 3,289,154 | 11/1966 | Cunningham | 181—.5 X |
| 3,307,648 | 3/1967 | Masterson | 181—.5 |
| 3,313,370 | 4/1967 | Cole | 181—.5 |
| 3,340,499 | 9/1967 | Hadley | 340—15.5 |

RODNEY D. BENNETT, *Primary Examiner.*

C. E. WANDS, *Assistant Examiner.*